United States Patent
Perin

(10) Patent No.: US 9,286,873 B2
(45) Date of Patent: Mar. 15, 2016

(54) VIBRATION SENSOR DEVICE FOR MUSICAL INSTRUMENTS

(71) Applicant: Jean-Pierre Ambroise Perin, Nimes (FR)

(72) Inventor: Jean-Pierre Ambroise Perin, Nimes (FR)

( * ) Notice: Subject to any disclaimer, the term of this patent is extended or adjusted under 35 U.S.C. 154(b) by 100 days.

(21) Appl. No.: 14/362,329

(22) PCT Filed: Nov. 9, 2012

(86) PCT No.: PCT/FR2012/052588
§ 371 (c)(1),
(2) Date: Jun. 2, 2014

(87) PCT Pub. No.: WO2013/079844
PCT Pub. Date: Jun. 6, 2013

(65) Prior Publication Data
US 2014/0326125 A1    Nov. 6, 2014

(30) Foreign Application Priority Data

Dec. 2, 2011 (FR) ...................................... 11 61074

(51) Int. Cl.
*G10H 3/18* (2006.01)
*G01D 5/22* (2006.01)

(52) U.S. Cl.
CPC ................ *G10H 3/181* (2013.01); *G10H 3/18* (2013.01); *G01D 5/2275* (2013.01); *G10H 2220/505* (2013.01)

(58) Field of Classification Search
CPC .. G10H 3/18; G10H 2220/505; G01D 5/2275
USPC ......................................................... 84/726
See application file for complete search history.

(56) References Cited

U.S. PATENT DOCUMENTS 3,226,639 A    12/1965  McAdam
4,143,575 A     3/1979  Oliver
(Continued)

FOREIGN PATENT DOCUMENTS

GB        2384564        7/2003

OTHER PUBLICATIONS

European Patent Office; Search Report in International Patent Application No. PCT/FR2012/052588 dated Jan. 31, 2013; 3 pages.
(Continued)

*Primary Examiner* — Jeffrey Donels
(74) *Attorney, Agent, or Firm* — Wood, Herron & Evans, LLP

(57) ABSTRACT

The present invention relates to a sensor device (2) for measuring a movement and/or a vibration of at least one object of interest, in particular for musical instruments, said device comprising (i) at least two excitation inductance coils (11, 12) electrically connected to at least one electric excitation source, and capable of generating excitation magnetic fluxes, and (ii) at least one measuring inductance coil (13), electrically connected to electrical measuring means capable of measuring induced electrical signals, (iii) a magnetic circuit (10) magnetically connecting the excitation coils (11, 12) and measuring (13) coils, and comprising a measuring area (17) wherein the presence of objects of interest affects magnetic fluxes coming from excitation coils (11, 12) and passing through said measuring coil or coils (13), and (iv) excitation coils (11, 12) arranged in such a way as to generate, in the absence of an object of interest in the measuring area (17), magnetic fluxes which substantially cancel each other out in the at least one measuring coil (13). The invention also relates to a sound system implementing said device.

16 Claims, 3 Drawing Sheets

(56) References Cited

U.S. PATENT DOCUMENTS

Figure 1:
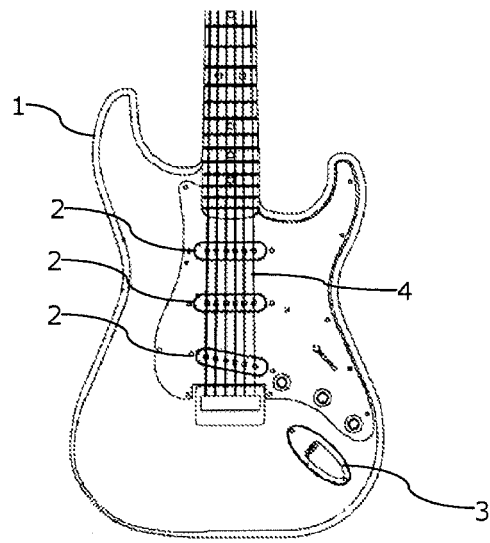

| | | | | |
|---|---|---|---|---|
| 4,348,930 | A | * | 9/1982 | Chobanian et al. ............. 84/726 |
| 4,378,722 | A | * | 4/1983 | Isakson ........................... 84/726 |
| 4,501,185 | A | * | 2/1985 | Blucher .......................... 84/728 |
| 5,148,733 | A | * | 9/1992 | Beller ............................. 84/726 |
| 5,523,526 | A | * | 6/1996 | Shattil ............................ 84/728 |
| 5,610,357 | A | * | 3/1997 | Frank-Braun ................... 84/726 |
| 5,767,431 | A | * | 6/1998 | Khanagov ....................... 84/726 |
| 6,075,198 | A | * | 6/2000 | Grant et al. .................... 84/731 |
| 6,211,671 | B1 | * | 4/2001 | Shattil ........................... 324/225 |
| 6,392,137 | B1 | * | 5/2002 | Isvan .............................. 84/726 |
| 7,408,109 | B1 | * | 8/2008 | Freitas ........................... 84/723 |
| 7,595,444 | B2 | * | 9/2009 | Stewart .......................... 84/728 |
| 2008/0245217 | A1 | * | 10/2008 | Stewart .......................... 84/727 |
| 2008/0245218 | A1 | | 10/2008 | Stewart |

OTHER PUBLICATIONS

French Patent Office; Search Report in French Patent Application No. 11 61074 dated Jul. 20, 2012; 2 pages.

\* cited by examiner

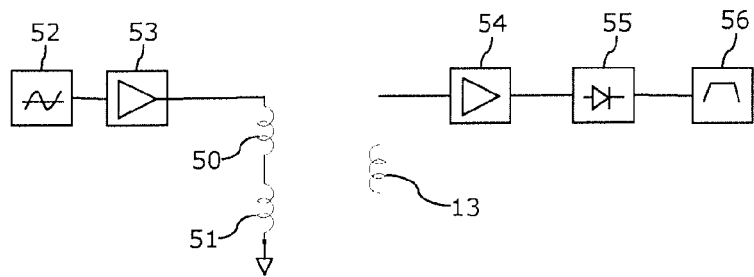
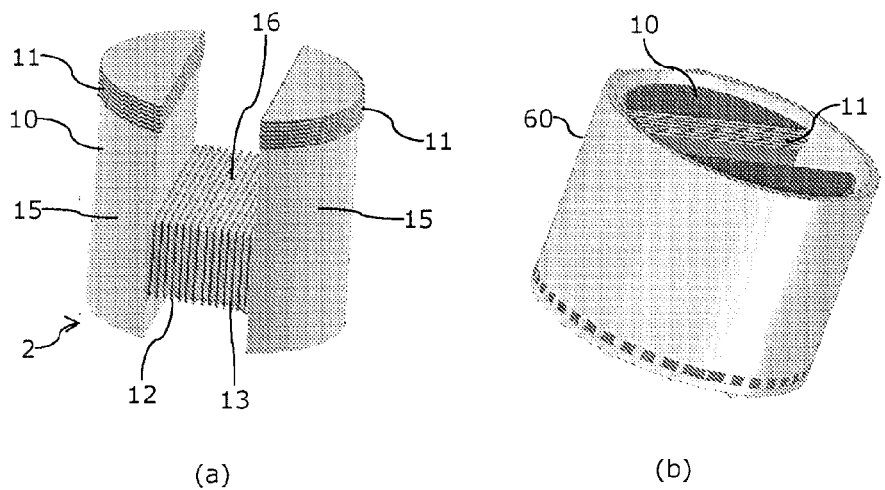
Figure 5
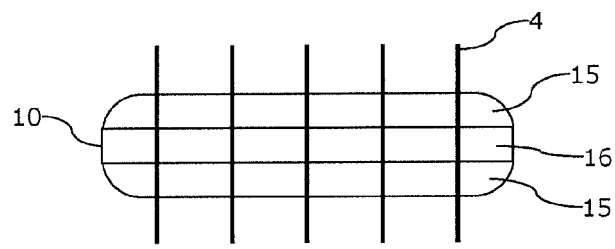
Figure 6
Figure 7

VIBRATION SENSOR DEVICE FOR MUSICAL INSTRUMENTS

TECHNICAL FIELD

The present invention relates to a vibration sensor device for musical instruments. It also relates to a sound generation system implementing the device.

The field of the invention is more particularly, but non-limitatively, that of the sound system of stringed musical instruments.

STATE OF THE PRIOR ART

The sound system of stringed musical instruments, such as electric guitars or violins, is produced in general by means of devices which make it possible to directly measure the vibration of the strings.

In particular, devices exist that are based on an induction measuring principle. These devices are placed close to the strings. They comprise a permanent magnet which generates a static magnetic field, and an inductance coil through which a magnetic flux passes due to the magnet. The magnetic field is disturbed by the presence of the metallic string, the vibrations of which, by electromagnetic induction and/or variation of the magnetic circuit, cause flux variations in the inductance coil. Measurement of these flux variations is carried out by measuring the induced voltage at the terminals of the coil. This makes it possible to obtain a measurement of the vibration of the string then used for generating a sound.

These devices have a certain number of drawbacks:

their transfer function generally has the frequential behaviour of a resonant circuit with a narrow pass band and significant non-linearities. This severely affects the sound reproduction and creates distortion;

they also have problems of diaphony or coupling between adjacent strings of the instrument, which are also sources of noise and distortion. These problems originate in particular from parasitic magnetic coupling between the magnetic circuits of each string, and from the sensitivity of these devices to environmental disturbances.

Numerous realizations of such sound system devices are known, with varied magnetic circuit geometries and coil structures.

For example, document U.S. Pat. No. 5,789,691 is known, which describes a pickup device based on a permanent magnet, comprising a magnetic circuit with a ferromagnetic pin opposite each string, and detection coils which encompass the magnetic circuits as a whole and all of the strings. This makes it possible to produce cost-effective systems that are easier to interface.

Document U.S. Pat. No. 7,989,690 by Lawing is also known, which describes a pickup device in which the measurement of vibration of each string is carried out by means of a particular coil of a suitable shape, with the aim of improving the noise and distortion behaviour.

In general terms, the existing pickup devices for stringed instruments, due to their shortcomings in a metrological context, have a non-negligible effect on the sound produced and provide inadequate information on the vibration modes of the strings. These drawbacks are particularly inconvenient for the use of measurements of the vibration of strings in electronic sound generation systems, in which reliable and complete data is paramount.

A subject of the present invention is to propose a pickup device, in particular for measuring the vibrations of strings of musical instruments, that is suitable for producing a measurement of the vibration that is reliable in metrological terms, in particular from the point of view of the spectral content, dynamics and distortion.

A further subject of the present invention is to propose a pickup device with a sensitivity adapted to the different spatial modes of vibration of the strings.

A further subject of the present invention is to propose a pickup device that is easy to incorporate into existing instruments, not very sensitive to environmental disturbances, and with a spatially confined measurement area.

DESCRIPTION OF THE INVENTION

This aim is achieved with a sensor device for measuring a movement and/or a vibration of at least one object of interest, in particular for musical instruments, comprising:

at least two electrically excited inductance coils connected to at least one electrical excitation source, and suitable for generating magnetic excitation fluxes, and at least one measuring inductance coil, electrically linked to electrical measuring means suitable for measuring induced electrical signals, characterized in that it comprises moreover:

a magnetic circuit magnetically connecting the excitation and measuring coils, and comprising a measurement area in which the presence of objects of interest affects magnetic fluxes originating from excitation coils and passing through said measuring coil(s), and excitation coils arranged so that in the absence of an object of interest in the measurement area, they will generate magnetic fluxes which substantially balance each other out in the at least one measuring coil.

The measurement area can comprise in particular a gap width, or a free space in the magnetic circuit.

Depending on the embodiments, the device according to the invention can comprise:

a measuring coil, a first excitation coil strongly coupled to said measuring coil so that the flux generated by said first excitation coil in the measuring coil is only slightly affected by the presence of an object in the measurement area, and a second excitation coil more weakly coupled to said measuring coil so that the flux generated by said second excitation coil in the measuring coil is strongly affected by is the presence of an object in the measurement area;

a measuring coil and two excitation coils coupled to said measuring coil so that the flux generated by said excitation coils in the measuring coil is affected substantially identically by the presence of an object in the measurement area; excitation and measuring coils each produced in one of the following forms: a single winding, a plurality of partial windings distributed over the magnetic circuit.

According to embodiments, the magnetic circuit can comprise a magnetic material, i.e., a material with a magnetic permeability greater than one, such as for example a ferromagnetic material or a ferrimagnetic material.

According to embodiments, the magnetic circuit can comprise a portion constituted at least partially by magnetic material, having a substantially U-shaped cross section with a base and two arms that are substantially parallel, the measurement area extending substantially beyond and between the ends of said arms opposite said base.

The arms, or the arms and the base, can comprise a magnetic material.

The device according to the invention can comprise moreover:
- a measuring coil wound around the base, a first excitation coil wound around said base, and a second excitation coil with two partial windings wound respectively around the two arms so as to generate in the measurement area respectively an outward flux from one arm and an inward flux in the other arm;
- a measuring coil wound around the base, and two excitation coils wound respectively around the two arms so as to generate in the measurement area outward fluxes from said arms;
- a measuring coil wound around one arm, and two excitation coils wound respectively around the two arms so as to generate in the measurement area outward fluxes from said arms.

According to other embodiments, the magnetic circuit can comprise:
- a portion constituted at least partially by magnetic material, having a substantially E-shaped cross section with a base, a central arm and two substantially parallel side arms, the measurement area extending substantially beyond and between the ends of said arms opposite said base,
- a measuring coil wound around said central arm,
- a first excitation coil wound around said central arm, and
- a second excitation coil with two partial windings wound respectively around the two side arms.

The coils can be produced according to plan argeometry, in particular with printed-circuit production techniques.

According to yet further embodiments, the magnetic circuit can comprise:
- a portion constituted at least partially by magnetic material, substantially cylindrical in shape and having a substantially E-shaped diametral section with a base, a central pin and an outer ring, the measurement area extending substantially opposite said base,
- a measuring coil wound around said central pin,
- a first excitation coil wound around said central pin, and
- a second excitation coil wound around said outer ring.

A device is also proposed for capturing the sounds of a stringed musical instrument, which is suitable for being placed on said instrument in order to measure the vibration of at least one string.

The device can comprise:
- a substantially cylindrical magnetic circuit defining a measurement area making it possible to measure the vibration of a string of the instrument without being significantly affected by the vibration of adjacent strings;
- a magnetic circuit substantially elongated in shape, defining a measurement area making it possible to measure the vibration of a plurality of strings of the instrument.

A device according to the invention is also proposed for capturing the vibrations of an object of interest having one of the following forms:
- an element or a surface of a musical instrument,
- a membrane sensitive to an acoustic vibration.

According to another aspect, a sound generation system is proposed, comprising a vibration measuring device according to the invention, and electronic and calculation means for generating sounds on the basis of the measured vibrations.

The sound generation system according to the invention can be configured so as to be able to generate sounds reproducing the tones of a specific microphone and/or of the set of a specific instrument and microphone.

Thus, the invention makes a certain number of innovations possible, in particular as regards its use for capturing the sounds of instruments. It becomes possible in particular:
- to capture all the data originating from the vibrations of the strings in a linear manner, and in particular the extreme frequencies of the audible spectrum (infrabass, bass and treble);
- to reproduce by combined electronic filtering the tones of microphones of the prior art, the frequential tones of which are those of an RLC circuit (resistor, inductor, capacitor) resonating in the audible spectrum;
- to have a greater dynamic range than the systems of the prior art, and therefore better performance with respect to the signal-to-noise ratio;
- to carry out a high-fidelity transduction of the vibrations of the strings of instruments;
- to obtain greater tone due to the possibility of exploiting data that is not captured by the microphones of the prior art.

DESCRIPTION OF THE FIGURES AND EMBODIMENTS

Figure 2:
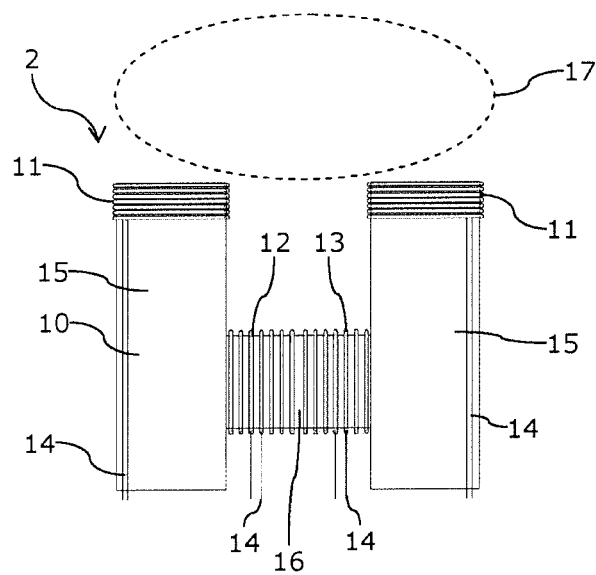

Other advantages and characteristics of the invention will become apparent on examination of the detailed description of implementations and embodiments that are in no way limitative, and of the following attached diagrams:

FIG. 1 shows a stringed instrument in the form of an electric guitar equipped with devices according to the invention, FIG. 2 shows a profile view of a device according to the invention, FIG. 3(a) shows a first variant of a winding mode in which the device according to the invention is sensitive essentially to vertical movements such as shown in FIG. 3(b), FIG. 4(a) shows a second variant of a winding mode in which the device according to the invention is sensitive essentially to horizontal movements such as shown in FIG. 4(b), FIG. 5 shows an electrical diagram of a device according to the invention, FIG. 6 shows an embodiment of a device according to the invention suitable for measuring the movement of a string, with the device of FIG. 6(b) shown without shielding in FIG. 6(a), FIG. 7 shows a top view of a device according to the invention according to an embodiment suitable for simultaneously measuring the movement of a plurality of strings.

With reference to FIG. 1, there will be described embodiments that are in no way limitative of pickup devices according to the invention for measuring the vibration of the strings of a musical instrument such as a guitar.

The device according to the invention or sensor 2 is designed so as to be able to be fixed onto the body of a guitar 1, below the strings 4. It can in particular be produced so as to be able to be fixed onto existing instruments 1, in housings provided for sound sensors of the prior art.

Conventionally, instrument 1 comprises a connector 3 which makes it possible to link the sensor(s) 2 to an electronic unit and/or an external sound system.

With reference to FIG. 2, the sensor 2 comprises a magnetic circuit essentially constituted by an element 10 made from magnetic or ferromagnetic material such as ferrite. This element 10 has a substantially U-shaped or H-shaped profile, with a base 16 and substantially parallel arms 15 which extend upwards substantially perpendicularly to this base.

The device comprises moreover inductance coils 11, 12, 13 produced with an electrically conductive element such as copper wire wound around the ferromagnetic element 10, directly or on a support. These coils are connected together and/or to an electronic control unit by connecting wires 14. They comprise a measuring coil 13 wound around the base 16, and two excitation coils 11, and 12 wound respectively around the arms 15 and the base 16 of the magnetic circuit.

The excitation 11, 12 and measuring 13 coils are electromagnetically coupled by the magnetic circuit and in particular by the ferromagnetic element 10. When the excitation coils 11, 12 are excited by an alternating signal, they generate magnetic fluxes, a part of which at least passes through the measuring coil and generates an induced voltage at its terminals.

The structure of the magnetic circuit and of the windings is designed so as to define a measurement area 17 which extends substantially beyond the arms 15 of the magnetic circuit. An electrically conductive object (such as an instrument string 4) present in this measurement area 17 disturbs the magnetic fluxes passing through the measuring coil 13, allowing it to be detected.

This measurement area 17 constitutes a gap width of the magnetic circuit, which makes it possible for it to be spatially confined. In fact, the magnetic field lines present in the magnetic circuit are only slightly influenced by objects close to the ferromagnetic element 10, with the exception of the measurement area 17. This confinement effect is important for limiting environmental disturbances, facilitating the incorporation of the sensor 2 into an instrument 1, and limiting the effects of diaphony between adjacent strings 4.

It should be noted that the use of a magnetic circuit with (at least) two arms 15 substantially improves the confinement of the measurement area 17 with respect to the devices of the prior art in which the magnetic circuit is in general constituted by a single pin close to the string 4.

Figure 3:
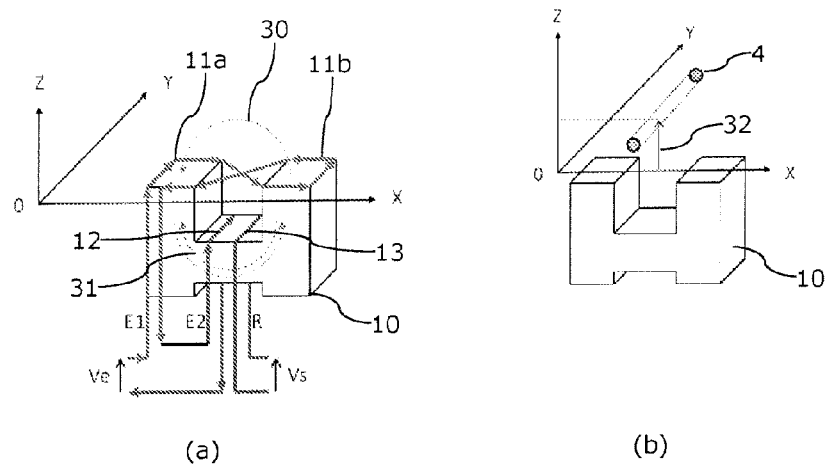
Figure 4:
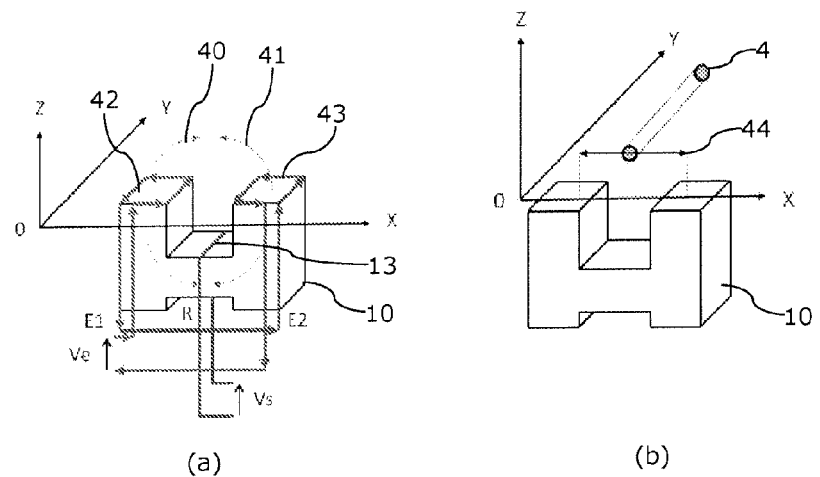

FIGS. 3 and 4 show two variant embodiments of the windings which make it possible to produce sensors 2 that are essentially sensitive, respectively, to vibration modes of the strings 4 that are vertical (i.e., substantially parallel to the arms 15) or horizontal (i.e., substantially parallel to the base 16).

An advantage of the invention is the ability to measure the horizontal and vertical vibration modes of the strings 4 separately. This makes it possible for richer and/or better defined data to be provided to sound generation systems. Measurement of one or the other mode can be prioritized by mounting a suitable sensor 2 onto a instrument 1, or the two modes can be measured simultaneously, for example by mounting two sensors 2 onto the instrument 1.

In the variant shown in FIG. 3a, the sensor 1 comprises:
a measuring coil 13 R placed around the base 16 of the magnetic circuit 10,
an excitation coil 12 E2 placed around the base 16 of the magnetic circuit 10, and
an excitation coil 11 E1, constituted by two partial coils 11a, 11b respectively placed around the arms 15 of the magnetic circuit 10.

The excitation coils 11a, 11b and 12 are linked in series and connected to an alternating excitation source Ve.

The excitation coil 12 is strongly coupled to the measuring coil 13 in the sense that the essential part of the magnetic fluxes 31 that it generates also passes through the measuring coil 13. Moreover, the flux 31 generated by the excitation coil 12 and coupled in the measuring coil 13 is not affected, or only slightly affected, by the presence of an object 4 in the measurement area 17.

The two partial coils 11a and 11b are wound in opposite directions, so as to generate respectively an outward flux 30 in the measurement area 17 (for example at the level of the coil 11b) and an inward flux 30 in the arm 15 (for example at the level of the coil 11a).

As these coils 11a, 11b are placed on either side of the measurement area 17, they generate a flux 30 which is strongly affected by the presence of an object 4 in the measurement area 17.

The excitation coils 11a, 11b and 12 are wound so that the irrespective fluxes 30, 31 passing through the measuring coil 13 are in phase opposition. Moreover, their inductances are adjusted so that, taking account of the coupling, the resulting flux in the measuring coil 13 is almost zero, i.e., the fluxes 30, 31 balance each other out at least partially at the level of the measuring coil 13.

To the extent that the excitation coil 11a, 11b is less well coupled to the measuring coil 13 than the excitation coil 12 (or has greater flux leakages), it comprises a greater total number of turns.

As shown in FIG. 3b, this arrangement makes it possible to measure the movement 32 of an object 4 along the vertical axis Oz (substantially parallel to the arms 15) independently of the variations of position of this same object 4 in the plane of the perpendicular axes Ox and Oy.

In fact, the magnetic fields generated by the excitation coils 11 and 12 are in phase opposition and balance each other out at least partially across the measuring coil 13 in the absence of an object 4. Moreover, only the field of the coil 11 is significantly modified by the presence of the object 4.

The magnetic fields generated by the partial excitation coils 11a, 11b of the coil 11 balance each other out when the object 4 describes a movement along the axis Ox and therefore do not give rise to a variation of the measured voltage Vs in the measuring coil 13.

Moreover, to the extent that the target 4 such as a string of an instrument has a dimension assumed to be infinite along the axis Oy with respect to the dimensions of the sensor 1, no measurement is carried out on this axis.

In the variant shown in FIG. 4a, the sensor 1 comprises:
a measuring coil 13 R placed around the base 16 of the magnetic circuit 10,
an excitation coil 42 E1 placed around an arm 15 of the magnetic circuit 10, and
an excitation coil 43 E2 placed around the other arm 15 of the magnetic circuit 10.

The excitation coils 42 and 43 are linked in series and connected to an alternating excitation source Ve. The excitation frequency can be of the order of 1 MHz. Both excitation coils 42, 43 are coupled in a substantially identical manner to the measuring coil 13.

The two excitation coils 42, 43 are wound in opposite directions, so as to generate in the measurement area 17, fluxes 40, 41 with opposite orientations.

As these excitation coils 42, 43 are placed on either side of the measurement area 17, the fluxes 40, 41 that they generate are strongly affected by the presence of an object 4 in the measurement area 17.

The excitation coils 42, 43 are wound so that the irrespective fluxes 40, 41 passing through the measuring coil 13 are also in phase opposition, and the resulting flux in the measuring coil 13 is close to zero, i.e., the fluxes 40, 41 balance out at least partially at the level of the measuring coil 13.

As shown in FIG. 4b, this arrangement makes it possible to measure the movement 44 of an object 4 along the horizontal axis Ox (substantially parallel to the base 16) independently of the variations of position of this same object 4 along the perpendicular axes Oz and Oy.

In fact, the magnetic fields generated by the excitation coils 42 and 43 are in phase opposition and balance each other out at least partially across the measuring coil 13 in the absence of an object 4. Moreover, the magnetic fields generated respectively by the excitation coil 42 and by the excitation coil 43 are both modified by the presence of the object 4.

The magnetic fields generated by the excitation coils 42 and 43 balance each other out when the object of interest 4 describes a movement along the vertical axis Oz and do not give rise to a variation of the voltage Vs in the measuring coil 13.

It is necessary for the object 4 to be substantially centred with respect to both excitation coils 42, 43 and for its movement 44 to be smaller than the distance separating the centre of the excitation coils 42 and 43. In fact, the rejection of the movement of the object 4 along the axis Oz is relatively greater when the object 4 is centred between the excitation coils 42 and 43.

Moreover, to the extent that the target 4, such as a string of an instrument, has a dimension assumed to be infinite along the axis Oy with respect to the dimensions of the sensor 1, no measurement is carried out on this axis.

FIG. 5 shows a sequence of capture and processing of the measurement signals. It comprises an excitation portion, comprising an oscillator 52 and an amplifier 53, for generating a high-frequency excitation signal Ve of the order of 1 MHz.

The amplifier 53 supplies excitation coils 50, 51 connected in series and arranged in particular according to the embodiments in FIGS. 3 and 4.

The processing sequence comprises an amplifier 54, a rectifier 55 and a low-pass filter 56. It makes it possible to rectify and filter the induced voltage Vr measured at the terminals of the measuring coil 13 in order to extract therefrom the envelope which is representative of the vibration of the object 4.

The demodulated signal can then be processed by digital or analogue sound, sound generation or sound synthesis systems.

The number of turns of the measuring coil 13 is maximized in order to obtain a maximum voltage Vs and a pass band covering at least the audible spectrum (up to 20 kHz).

It a been demonstrated, in particular in the embodiment in FIG. 3, that the sensor is more sensitive when the voltage Vs in the absence of an object 4 is not equal to zero but rather to a low value which corresponds to the case where the contribution of E2 in R is greater than that of E1 in R.

It is thus possible to obtain an electrical signal representative of the movements of an object 4 such as a string of a musical instrument:
in one or more specific directions,
linearly, and
over an entire frequency band ranging from DC to several tens of kHz.

With reference to FIG. 6, the sensor 2 can be produced in a substantially cylindrical shape, with a diameter of the order of 5 mm. The configuration of the excitation coils 11, 12 can be according to the embodiment in FIG. 3 or that in FIG. 4. The sensor 1 is more over provided with a shield 60 on its periphery which improves its immunity to interference, and the confinement of the measurement area 17.

This embodiment makes it possible to equip an instrument 1 with sensors 2 so that each sensor 2 measures only the vibration of an individual string 4.

With reference to FIG. 7, the sensor 2 can be produced in a substantially elongated shape, so as to present a measurement area 17 suitable for encompassing several strings 4 (or all the strings 4) of an instrument 1.

FIG. 7 shows a top view of a sensor 2 with a base 16 and two arms 15, a profile view of which corresponds to FIG. 2.

The configuration of the excitation coils 11, 12 is that of the embodiment in FIG. 3. Thus the sensor 2 is sensitive to the vertical movement 32 along the axis Oz of the strings 4, including when the strings extend in the direction of the arms 15 along the axis Oy.

This embodiment makes it possible to equip an instrument 1 with a single, simple sensor, which provides a signal Vs representing the set of vibrations of the strings 4 which pass through the measurement area 17.

According to Variants,

The excitation coils can be linked to the electronic unit in all possible ways, in particular in series, in parallel, or supplied by different excitation sources;

The demodulation of the signal representing the vibration can be carried out by digital means, after direct capture of the signal Vr. It can also be carried out by a synchronous demodulator.

Of course, the invention is not limited to the examples which have just been described and numerous adjustments can be made to these examples without exceeding the scope of the invention.

The invention claimed is:

1. A sensor device configured to measure a movement and/or a vibration of at least one object of interest, in particular musical instruments, comprising:
   at least two excitation inductance coils electrically linked to at least one electrical excitation source and suitable for generating magnetic excitation fluxes, and
   at least one measuring inductance coil, electrically linked to electrical measuring device suitable for measuring induced electrical signals,
   a magnetic circuit magnetically linking the excitation and measuring coils, and comprising a measurement area in which the presence of the at least one object of interest affects magnetic fluxes originating from excitation coils and passing through said measuring coil(s), and
   the excitation coils arranged so that in the absence of the at least one object of interest in the measurement area, they generate magnetic fluxes which substantially balance each other out in the at least one measuring coil.

2. The device according to claim 1, comprising a measuring coil, a first excitation coil strongly coupled to said measuring coil so that the flux generated by said first excitation coil in the measuring coil is only slightly affected by the presence of an object in the measurement area, and a second excitation coil more weakly coupled to said measuring coil so that the flux generated by said second excitation coil in the measuring coil is strongly affected by the presence of an object in the measurement area.

3. The device according to claim 1, comprising a measuring coil and two excitation coils coupled to said measuring coil so that the flux generated by said excitation coils in the measuring coil is affected substantially identically by the presence of an object in the measurement area.

4. The device according to claim 1, comprising excitation and measuring coils, each produced in one of the following forms: a single winding, or a plurality of partial windings distributed over the magnetic circuit.

5. The device according to claim 1, in which the magnetic circuit comprises a portion constituted at least partially by magnetic material, having a substantially U-shaped cross section with a base and two arms that are substantially parallel, the measurement area extending substantially beyond and between the ends of said arms opposite said base.

6. The device according to claim 5, comprising a measuring coil wound around the base, a first excitation coil wound around said base, and a second excitation coil with two partial windings wound respectively around the two arms so as to generate in the measurement area respectively an outward flux from one arm and an inward flux in the other arm.

7. The device according to claim 5, comprising a measuring coil wound around the base, and two excitation coils wound respectively around the two arms so as to generate in the measurement area outward fluxes from said arms.

8. The device according to claim 5, comprising a measuring coil wound around an arm, and two excitation coils wound respectively around the two arms so as to generate in the measurement area outward fluxes from said arms.

9. The device according to claim 1, in which the magnetic circuit comprises:
- a portion constituted at least partially by magnetic material, having a substantially E-shaped cross section with a base, a central arm and two substantially parallel side arms, the measurement area extending substantially beyond and between the ends of said arms opposite said base,
- a measuring coil wound around said central arm,
- a first excitation coil wound around said central arm, and
- a second excitation coil with two partial windings wound respectively around the two side arms.

10. The device according to claim 1, in which the magnetic circuit comprises:
- a portion constituted at least partially by magnetic material, substantially cylindrical in shape and having a substantially E-shaped diametral section with a base, a central pin and a outer ring, the measurement area extending substantially opposite said base,
- a measuring coil wound around said central pin,
- a first excitation coil wound around said central pin, and
- a second excitation coil wound around said outer ring.

11. A sound generation system comprising:
- a stringed musical instrument,
- a device according to claim 5, for capturing the sounds of said stringed musical instrument when placed on said stringed musical instrument in order to measure the vibration of at least one string.

12. The device according to claim 11, comprising a substantially cylindrical magnetic circuit defining a measurement area making it possible to measure the vibration of a string of the instrument without being significantly affected by the vibration of adjacent strings.

13. The device according to claim 11, comprising a magnetic circuit substantially elongated in shape, defining a measurement area making it possible to measure the vibration of a plurality of strings of the instrument.

14. A sound generation system comprising:
- at least one object of interest,
- a device according to claim 1, for capturing the vibrations of the at least one object of interest,
- wherein the at least one object of interest may be an element of a musical instrument, a surface of a musical instrument, or a membrane sensitive to an acoustic vibration.

15. A sound generation system comprising:
- a vibration measuring device according to claim 1, and
- an electronic and calculation device configured to generate sounds on the basis of vibrations measured by the vibration measuring device.

16. The sound generation system according to claim 15, wherein the electronic and calculating device generates sounds reproducing the tones of at least one of a specific microphone or of a specific instrument and microphone.

* * * * *